Patented Apr. 28, 1931

1,802,753

UNITED STATES PATENT OFFICE

SIDNEY M. CADWELL, OF LEONIA, NEW JERSEY, AND EARDLEY HAZELL, OF NEW YORK, N. Y., ASSIGNORS TO THE NAUGATUCK CHEMICAL COMPANY, OF NAUGATUCK, CONNECTICUT, A CORPORATION OF CONNECTICUT

PROCESS FOR INCREASING THE STABILITY AND FILTERABILITY OF LATEX

No Drawing.   Application filed April 22, 1927.  Serial No. 185,906.

The invention relates to a method of increasing the mechanical stability of rubber latex and imparting an increased ease of filterability to the latex without causing its coagulation. The invention is also concerned with increasing the rate of deposition of the rubber from the latex upon a filtering surface.

The invention consists in treating a preserved latex, either vulcanized or unvulcanized, with an aldehyde, and allowing the latex to stand for a time. The invention also consists in further increasing the mechanical stability of the latex by the addition of a stabilizing agent. It is within the scope of the invention to heat the latex after the introduction of the aldehyde.

One embodiment of the method of obtaining an increased mechanical stability and an increased rate of filtration in a latex is as follows: A mixture of 100 parts of rubber in the form of ammonia preserved latex, 3 parts of zinc oxide, 3 parts of sulphur, and 1 part of glue is prepared in any convenient manner. To this mixture is then added 1 part of cinnamic aldehyde in the form of an emulsion. The treated latex is then allowed to stand for a time. It will be observed that immediately after the introduction of the aldehyde the mechanical stability, that is the resistance to coagulation, of the latex decreases slightly, but upon further standing the stability shows a marked increase, being doubled at the end of a week and quadrupled at the end of two weeks. The rate of deposition of the rubber upon a filtering body, that is the filterability of the latex, increases from the time the aldehyde is introduced, and continues to increase upon standing. At the time of the addition of the aldehyde, the rate of filtration is approximately doubled, and after a week's standing is tripled.

The introduction of 1% of a soap such as sodium undecylenate to the latex prior to the introduction of the cinnamic aldehyde, will eliminate the temporary decrease in mechanical stability observed in the freshly treated latex. It is desirable to introduce the soap or other suitable stabilizer before adding the aldehyde in order to obtain this immediate increase in stability. The rate of increase can be accelerated by heating the latex for a short time at about 100° C. By so doing it is possible to use the latex within a very short space of time after its treatment. If, however, it is not desired to use the latex in the manufacture of rubber articles at once, the soap treatment may be omitted, as the stability and filterability will be sufficiently increased by the time the latex is to be used.

Instead of cinnamic aldehyde the following aldehydes may be employed in the same percentage or in larger percentages, say up to 4% on the rubber:—butyl aldehyde, heptaldehyde, other poly-carbon aldehydes such as duodecyl aldehyde, benzaldehyde, furfural, salicyl aldehyde, these being representative of both the open chain and cyclic aldehydes, and having more than two carbons in connection with a CHO group. The invention may be carried out with equally good results on either ammonia preserved latex or upon vulcanized latex, and appears to be especially adaptable to unvulcanized or vulcanized latices containing a nitrogenous material such as ammonia or an amine. The aldehydes may be added in any desired way, but it will be found that their introduction as emulsions is quite satisfactory. Of course water soluble aldehydes are preferably added in their water solutions. Emulsions may be prepared in any desired way, as for example emulsions in water containing a protective colloid such as glue.

The latex so treated shows an increased stability against coagulation such as that caused by agitation, pumping, handling, and the like, whether in connection with manufacturing processes or in storage. The filterability of the treated latex is greatly increased and as a result of this the rubber in the latex may be deposited upon a filtering surface at a more rapid rate and will give a thicker deposit in the same length of time as an untreated latex. These two properties are especially valuable in the manufacture of rubber articles direct from latex, where the aqueous portion of the latex is withdrawn through a porous form or a filtering medium. In instances where the latex contains ammonia or an amine, it will frequently be observed that the rubber derived from such treated latex shows enhanced resistance to aging, probably due to the formation of aldehyde amine condensation products in the latex.

The term "latex" without qualification signifies any of the rubber latices whether artificial or natural, vulcanized or unvulcanized, and the term is understood to include Hevea latex as well as the latices of species other than Hevea.

Having thus described our invention, what we claim and desire to protect by Letters Patent is:

1. A method of increasing the mechanical stability and filterability of latex which comprises incorporating a cinnamaldehyde with the latex, thereby to produce an uncoagulated latex having said increased stability and filterability.

2. A method of increasing the mechanical stability and filterability of latex which comprises incorporating cinnamaldehyde with the latex, and heating, thereby to produce an uncoagulated latex having said increased stability and filterability.

3. A method of increasing the mechanical stability and filterability of latex which comprises adding to latex an undecylenic acid soap and an aldehyde in liquid form having more than two carbon atoms in connection with a CHO group, thereby to produce an uncoagulated latex having said increased stability and filterability.

4. A method of increasing the mechanical stability and filterability of latex which comprises adding sodium undecylenate and a cyclic aldehyde in liquid form to the latex, and permitting the mixture to stand, thereby to produce an uncoagulated latex having said increased stability and filterability.

5. A method of increasing the mechanical stability and filterability of latex which comprises adding sodium undecylenate and cinnamaldehyde to the latex, thereby to produce an uncoagulated latex having said increased stability and filterability.

6. A method of increasing the mechanical stability and filterability of latex which comprises adding to latex an undecylenic acid soap and an aldehyde in liquid form having more than two carbon atoms in connection with a CHO group and heating for a short time, thereby to produce an uncoagulated latex having said increased stability and filterability.

7. A method of increasing the mechanical stability and filterability of latex which comprises adding a soap and a cyclic aldehyde in liquid form to latex, and heating for a short time, thereby to produce an uncoagulated latex having said increased stability and filterability.

8. A method of increasing the mechanical stability and filterability of latex which comprises adding sodium undecylenate and cinnamaldehyde to the latex, and heating for a short time, thereby to produce an uncoagulated latex having said increased stability and filterability.

9. As a new product uncoagulated latex containing an aldehyde selected from the group comprising butyl aldehyde, heptaldehyde, duodecylaldehyde, benzaldehyde, cinnamaldehyde, and salicyl aldehyde, said latex being characterized by an increased mechanical stability and filterability.

10. As a new product uncoagulated latex containing cinnamaldehyde, said latex being characterized by an increased mechanical stability and filterability.

11. As a new product uncoagulated latex containing an aldehyde having more than two carbon atoms in connection with a CHO group and a protective colloid to stabilize the latex against coagulation, said latex being characterized by an increased mechanical stability and filterability.

12. As a new product uncoagulated latex containing an aldehyde having more than two carbon atoms in connection with a CHO group and an undecylenic acid soap, said latex being characterized by an increased mechanical stability and filterability.

13. As a new product uncoagulated latex containing cinnamic aldehyde and a stabilizing agent, said latex being characterized by an increased mechanical stability and filterability.

14. As a new product uncoagulated latex containing cinnamaldehyde and sodium undecylenate, said latex being characterized by an increased mechanical stability and filterability.

Signed at New York, New York, this 9th day of April, 1927.

SIDNEY M. CADWELL.

Signed at New York, New York, this 8th day of April, 1927.

EARDLEY HAZELL.